United States Patent

[11] 3,627,648

[72] Inventor Herbert A. Waggener
Allentown, Pa.

[21] Appl. No. 814,647
[22] Filed Apr. 9, 1969
[45] Patented Dec. 14, 1971
[73] Assignee Bell Telephone Laboratories, Incorporated
Murray Hills, Berkeley Heights, N.J.

[54] ELECTROPLATING METHOD
9 Claims, 2 Drawing Figs.

[52] U.S. Cl. .......... 204/27, 204/32 S, 204/231
[51] Int. Cl. .......... C23b 5/28, C23b 5/48
[50] Field of Search .......... 204/32 S, 231, 328, 23, 27

[56] References Cited
UNITED STATES PATENTS

| | | | |
|---|---|---|---|
| 2,823,175 | 2/1958 | Roschen | 204/32 Semi |
| 2,814,589 | 11/1957 | Waltz | 204/32 Semi |
| 3,166,484 | 1/1965 | Hentz | 204/231 X |

*Primary Examiner*—F. C. Edmundsen
*Attorneys*—R. J. Guenther and Edwin B. Cave

ABSTRACT: The amount and quality of an electroplated deposit on articles having various areas to be plated are controlled by controlling the current density to one article, and applying a voltage to the remaining articles to be plated for the same time, the voltage applied being determined by the voltage developed at the surface of the first article, and thereby resulting in a controllable current density to the remaining articles.

INVENTOR
H. A. WAGGENER
BY
ATTORNEY

ELECTROPLATING METHOD

BACKGROUND OF THE INVENTION

Field

This invention relates to a method for simultaneously controlling the amount and quality of an electroplated deposit.

Prior Art

A predetermined amount of a plated deposit may be achieved by selecting the proper current and time, with knowledge of the area to be plated. However, where plating area is unknown or impractical to determine, as for example, where a large number of intricately shaped and various sized parts are to be plated, presently only the uniformity of the amount of deposit, and not a predetermined amount, may be achieved, by selecting some plating voltage, which will result in a uniform but indeterminant current density. Furthermore, since various physical characteristics of the plated deposit, such as color, density, adherence, crystallinity, etc., are often a function of current density, control of these characteristics may generally be achieved in the constant voltage technique only by arbitrary adjustment of the plating voltage, accompanied by inspection or testing of the plated parts.

The need to control the amount and quality of a plated deposit on numerous intricately shaped and various sized parts can become extremely critical in the case of gold plating of integrated circuits. Relatively thin gold deposits are often used to "metallize" or interconnect electronic components contained in silicon slices, thereby completing the formation of integrated circuits, while relatively thick gold deposits are often used to provide access to these tiny circuits.

The gold thickness can be critical in each of the above cases. In the thin metallization, the maximum allowable thickness is often determined by lateral plating effects, which may cause shorts where interlead spacings are small, while the minimum thickness is usually determined by required conductance. In the case of AIM (air isolated monolith) devices, the amount of metallizing gold must, of course, be consistent with mechanical strength requirements. In beam plating, error in determining the gold thickness can contribute to error in the final silicon thickness, and thus can contribute to uncertainty in the etching time required to separate circuit chips from the slice. Overetching often leads to destruction of the junctions, while underetching does not isolate circuit chips.

Even if the plating area could be determined satisfactorily for these integrated circuit requirements, other sources of error would often remain to contribute to variation in the plating thickness. In voltage-controlled apparatus, likely sources of this variation are varying resistances between the parts being plated and their supporting leads, as well as varying spreading resistances between the electrodes in the plating bath.

Summary

A method has been devised which enables control over both the amount and quality of an electroplated deposit, while insuring uniformity of the deposit on articles which may be of unknown area. Such is achieved by selecting a current density suitable for the desired quality and supplying this current density to one article for a time required to achieve the desired amount so as to result in some voltage at the surface of the article, and applying some voltage determined by the resultant voltage to the surface or surfaces of the additional articles to be processed for the same time, so as to result in a uniform and known current density to all of the additional articles and thereby in a uniform amount and quality of deposit on the additional articles.

Such an arrangement enables the achievement of a plating thickness close to the desired thickness on all articles plated without the necessity of measuring each area to be plated, and also enables predetermination of the plating current density in order to achieve control of the color, density, crystallinity or other physical characteristic of the plated deposit.

The method is equally applicable to any electrolytic processing technique, such as electroetching.

The voltage applied, while determined by the resultant voltage, may be different from the resultant voltage in order to compensate for spreading resistances and connecting resistances associated with the articles.

DETAILED DESCRIPTION OF THE INVENTION

The inventive method may be carried out in a conventional electrolytic cell, comprising for example an electroplating bath, an anode, and articles to be electroplated as the cathodes, In a preferred embodiment, some current *i* from a controllable source such as a current generator is supplied to one article of known surface area A. The cathode voltage V developed at the article, herein referred to as the control article, is then fed into a controllable voltage regulator such as differential amplifier, also referred to as an error amplifier or voltage follower.

Accordingly, the output from the voltage regulator is dependent upon the input from the control article, and, in the case of a differential amplifier connected for unity gain, the output is, of course, equal to the input. It will be appreciated by those skilled in the art that a nonunity gain would sometimes be preferred. For example, the effect of spreading resistances and resistance of leads and lead-to-article connections could be minimized by operating the amplifier at slight deviations from unity gain.

The output from the voltage regulator is, of course, connected to the remaining articles, which may be of unknown area, to be plated.

The surfaces of all articles as cathodes should be equipotential with respect to the anode, that is, all points on the surfaces to be plated should be equidistant from the anode surface, so that the current density may be the same at each surface.

Figure 1:
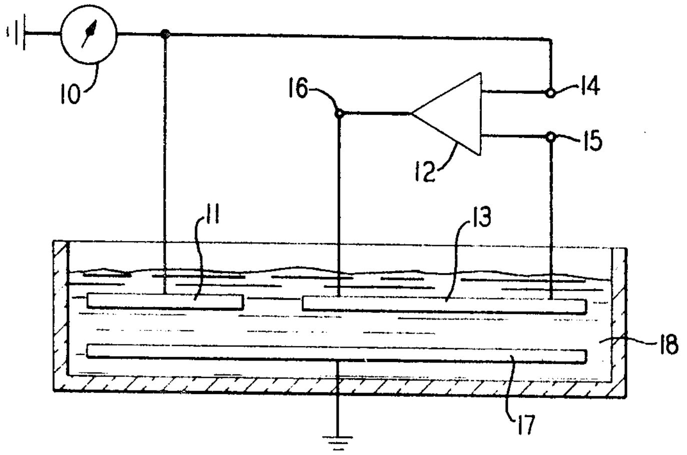
FIG. 1 is a schematic diagram of one arrangement for carrying out the inventive method.

REferring now to FIG. 1 of the drawing, there is shown one arrangement for practicing the inventive method. Current generator 10 is connected to control article 11, and differential amplifier 12 is connected to article 13. The positive input 14 to amplifier 12 is connected to the control article 11, and the signal from output 16 is fed back into amplifier 12 at negative input 15. Articles 11 and 13 are equidistant from anode 17, and each of electrodes 11, 13 and 17 are contacted by electroplating bath 18.

Figure 2:
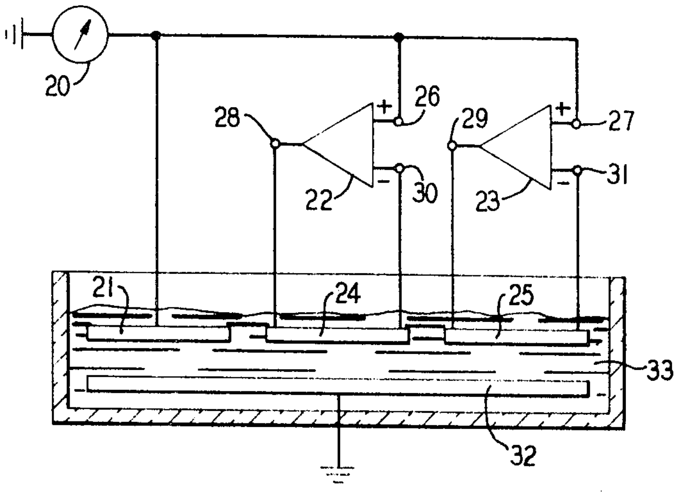
FIG. 2 is a schematic diagram of another arrangement for carrying out the inventive method.

In addition to varying the gain of the amplifier, further control may be had over the lead-to-article resistance by providing a bridge connection from the referenced articles to a negative input side of the amplifier. This arrangement would provide continuous correction for variations in he connecting resistance, as from worn or corroded clip connectors. (Of course, any feedback arrangement, which corrects for variations in the voltage at the referenced articles so as to maintain them at the level of the voltage derived from the control article, whether in unity gain or other mode, is satisfactory.) To further reduce the effect of varying resistances across the lead-to-article connections, each of the additional articles may be connected to a separate differential amplifier. Thus, the varying resistances affect the input voltages to the negative side of each amplifier, the effects of which resistances are accordingly minimized. An arrangement embodying these modifications is shown in FIG. 2, wherein current generator 20 is connected to control article 21, and differential amplifiers 22 and 23 are connected to articles 24 and 25, The positive inputs 26 and 27 to amplifiers 22 and 23 are connected to control article 21, while outputs 28 and 29 are connected to articles 24 and 25. Bridge connections are provided from articles 24 and 25 to the negative inputs 30 and 31. Articles 21, 24 and 25 are equidistant from anode 32, and are contacted by electroplating bath 33. While the effects of varying spreading resistances would be less significant, these could of course also be minimized where the amplifiers are of the variable gain type, as described above.

The time required to deposit some desired thickness on the articles can now be determined. The fact that each of a plurality of articles has various surface areas to be plated is unimportant, since each would be subjected to about the same current density, and each would thus be plated at about the same rate. Furthermore, since the magnitude of the current density is controllable, a current density can be chosen which is consistent with the obtaining of a particular color, density, adherence, crystallinity or other desired physical characteristic.

Lateral plating effects are often observed in electroplating apparatus, and if allowed to become large, can reduce the proportionality between thickness and amount of deposit and can in addition adversely effect device yields. Lateral plating can generally be minimized by keeping the cathode-to-anode spacing small. In general, a ratio of cathode-to-anode distance to lateral plating dimension of up to one is such as to allow useful control of electroplating.

EXAMPLE

Titanium-platinum coated silicon slices, having plating areas of from about 0.40 in.$^2$ to about 0.75 in.$^2$ were gold plated according to the inventive method using a citrate gold plating bath, and a cathode-to-anode spacing of about 0.5 inches, resulting in a ratio of cathode-to-anode distance to lateral plating dimension of about 1:1 to 1:2. Current was supplied to the control article from a constant current generator, resulting in current densities of about 12.5 ma./in.$^2$. The voltage to the referenced articles was regulated by a differential amplifier connected for unity gain. Typical results are shown in table I and table II, wherein results were obtained using arrangements similar to those depicted in FIGS. 1 and 2, respectively.

TABLE I

| Article | Area ratio | Mass gain ratio | Absolute difference (percent) |
|---|---|---|---|
| control 1 referenced 1 | 4/1 | 3.71/1 | −7.5 |
| control 2 referenced 2 | 1/1 | 0.98/1 | +2 |
| control 3 referenced 3 | 1/4 | 1/3.7 | −7.5 |

For a typical beam lead thickness of 12.5 microns, a difference of 7.5 percent corresponds to a plating thickness difference of about 0.95 microns, a generally acceptable variation in predicted thickness.

TABLE II

| Article | Area (in.$^2$) | Mass gain (gm) | Mass gain / Area (gm in.$^2$) | Error (%) |
|---|---|---|---|---|
| Control 1 | 0.40 | 0.05185 | 0.129 | |
| referenced 1A | 0.42 | 0.05502 | 0.132 | +3 |
| referenced 1B | 0.75 | 0.09201 | 0.123 | −4 |
| control 2 | 0.77 | 0.07045 | 0.0916 | |
| referenced 2A | 0.77 | 0.07160 | 0.0931 | +2 |
| referenced 2B | 0.76 | 0.07150 | 0.094 | +3 |

As may be seen, using the arrangement of FIG. 2, plating thicknesses having a maximum percent error of only 4 were obtained, an acceptable variation in predicted thickness.

An alternative arrangement for practicing the inventive method is one in which the articles to be plated are maintained equipotential, as for example, by connecting them to ground, and supplying current from a variable supply via the anode. The current density to one article is then monitored, as for example, by a zero resistance ammeter, and applied to the variable current supply to achieve the desired operating conditions.

The invention has been described n terms of a limited number of embodiments. However since it essentially teaches a method for achieving a uniform rate of electrolytic action on at least two articles, other embodiments are contemplated. For example, the polarity of the electrolytic cell could be reversed, so that electroetching could be achieved.

What is claimed is:

1. An electroplating method in which a control article and at least one additional article are desired to be processed at a known current density, comprising supplying a controlled current density to the control article for a certain time, so as to result in some voltage at the article, characterized in that the resultant voltage determines a different voltage which is applied at the surfaces of the additional articles for the same time, resulting in a uniform and controllable current density to the additional articles.

2. The method of claim 1 in which the controlled current density is supplied to the control article by means of a constant current generator connected to the control article.

3. The method of claim 1 in which the voltage to the additional articles is applied by means of at least one differential amplifier, whose input is the resultant voltage from the control article and whose output is the voltage to the referenced articles.

4. The method of claim 4 in which at least one differential amplifier is connected to each additional article.

5. The method of claim 1 in which the ratio of the longest dimension of the surface area of the articles to the distance between the articles and the electrode of opposite polarity is up to one.

6. The method of claim 1 in which at least one metal being plated is gold.

7. The method of claim 1 in which the articles comprise silicon slices.

8. The method of claims 7, in which the silicon slices support integrated circuits and in which the metal being plated metallizes the circuits and forms beam leads from the circuits.

9. The product produced by the method of claim 1.

* * * * *

UNITED STATES PATENT OFFICE
CERTIFICATE OF CORRECTION

Patent No. 3,627,648 Dated December 14, 1971

Inventor(s) Herbert A. Waggener

It is certified that error appears in the above-identified patent and that said Letters Patent are hereby corrected as shown below:

Column 2, line 22, change "cathodes," to --cathodes.--;

line 45, change "REferring" to --Referring--;

line 59, before "connecting" change "he" to --the--;

line 73, change "25," to --25.--.

Column 4, line 3, in the fourth vertical column of Table II, change "(gm in.$^2$)" to -- $\frac{gm}{in.^2}$ --;

line 22, after "described" change "n" to --in--;

line 46, change "of claim 4" to --of claim 3--;

line 56, change "of claims 7" to --of claim 7--.

Signed and sealed this 13th day of June 1972.

(SEAL)
Attest:

EDWARD M.FLETCHER,JR.
Attesting Officer

ROBERT GOTTSCHALK
Commissioner of Patents